March 26, 1968

L. G. KILMER ET AL 3,374,854

SEISMIC PULSE GENERATOR WITH GAS CUTOFF

Filed June 9, 1966

INVENTORS
LAUREN G. KILMER
WILLIAM W. BURRESS

BY

*McLean, Morton & Boustead*

ATTORNEYS.

INVENTORS
LAUREN G. KILMER
WILLIAM W. BURRESS

BY

McLean, Morton & Boustead
ATTORNEYS.

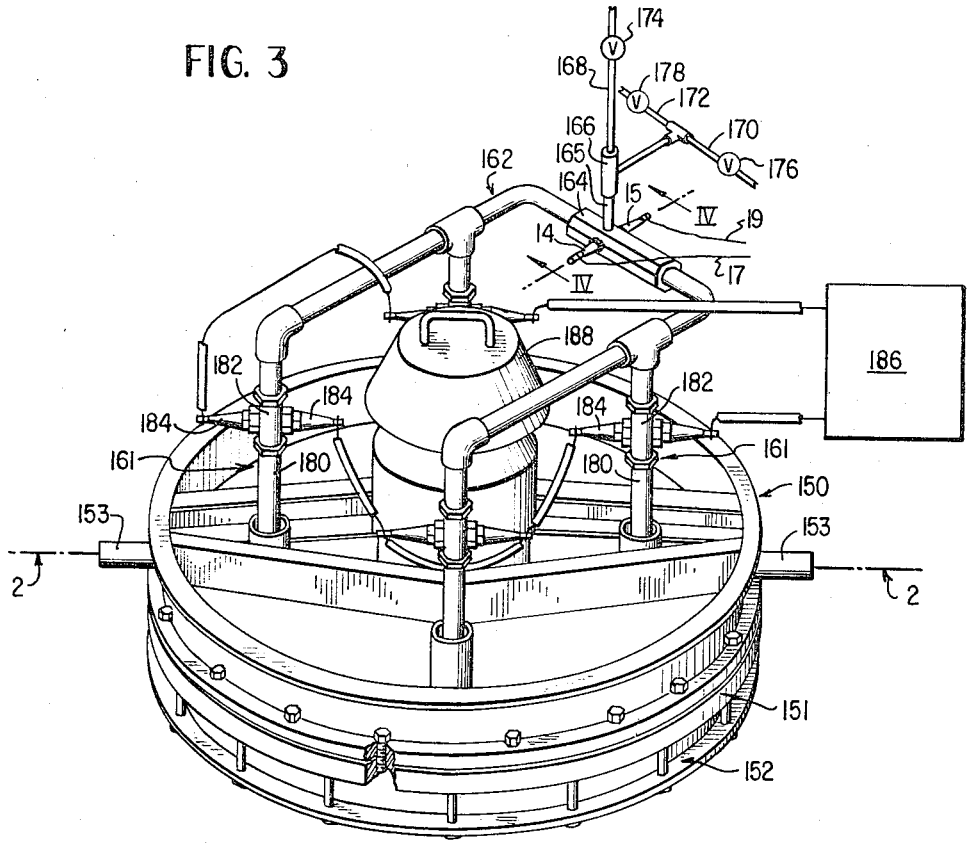

United States Patent Office 3,374,854
Patented Mar. 26, 1968

3,374,854
SEISMIC PULSE GENERATOR WITH GAS CUTOFF
Lauren G. Kilmer, Tulsa, and William W. Burress, Broken Arrow, Okla., assignors, by mesne assignments, to Sinclair Research, Inc., New York, N.Y., a corporation of Delaware
Filed June 9, 1966, Ser. No. 556,502
13 Claims. (Cl. 181—.5)

ABSTRACT OF THE DISCLOSURE

A gas exploder-type seismic wave generator including an explosion chamber and valved gas conduits for supplying gas to the chamber and having an ionization gap across which current passes when a flame is present within the chamber. The current triggers solenoids which close valves in the gas conduits to insure that no more gas is supplied to the chamber once the flame has been initiated.

---

Our invention relates to seismic prospecting and the generation of seismic waves by gas exploders, and more particularly, to a flame detector and gas fill system for preventing undesired explosions in the gas exploder.

As described in my co-pending applications Ser. No. 187,111, filed Apr. 12, 1962, now U.S. Patent No. 3,235,-027, and Ser. No. 314,230, filed Oct. 7, 1963, now U.S. Patent No. 3,314,497, an explosion of a combustible gas mixture confined in an expansible chamber acting at the earth-air interface against a large mass positioned above such gas explosion can be used to impart a compression pulse to the surface of the earth beneath the gas explosion, thereby initiating a seismic wave. If the explosion is confined in a device having a rigid top (carrying the weight of the large mass) and rigid bottom with vertical extensible sidewalls, the seismic wave generated is useful for seismic prosecuting by refraction and reflection techniques, since the pulse imparted to the earth's surface has a high energy content and can be made of extremely short duration.

It has been found, however, with such devices that improper mixing of fuel and oxygen for producing the gas mixture or the continuous inletting of either gas after the other has shut off can result in a "hold fire" or slow burn in remote areas of the exploder system. At the inletting of new gas after an explosion such "hold fire" pockets re-ignite the gas which then burns as filling continues, resulting in damage to manifold components and no material for another explosion. It is accordingly an object of the present invention to provide a flame detection system which will not only stop the filling of the gas exploder if the explosive charge ignites but also prevent further filling until the danger of an accidental burning has passed.

In accordance with this general object, it is a more specific object of my invention to provide an electrical flame detection circuit which includes a relay coil and a normally non-conducting ionization gap formed between a pair of spark plugs connected across a capacitor whose voltage is carefully regulated to maintain a predetermined voltage across the gap. When a flame is present, the gap will become ionized and current will flow through the ionization gap and the relay coil, thereby deactivating solenoid valve coils which, in turn, will close solenoid valves to block the supply of gas to the exploder.

For a more complete understanding of the specific application of our invention, reference is made to the appended drawings in which:

FIGURE 3 is a isometric view of a gas exploder connected in accordance with our invention; and FIGURE 4 is a view taken along section line IV—IV in FIGURE 3.

Figure 1:
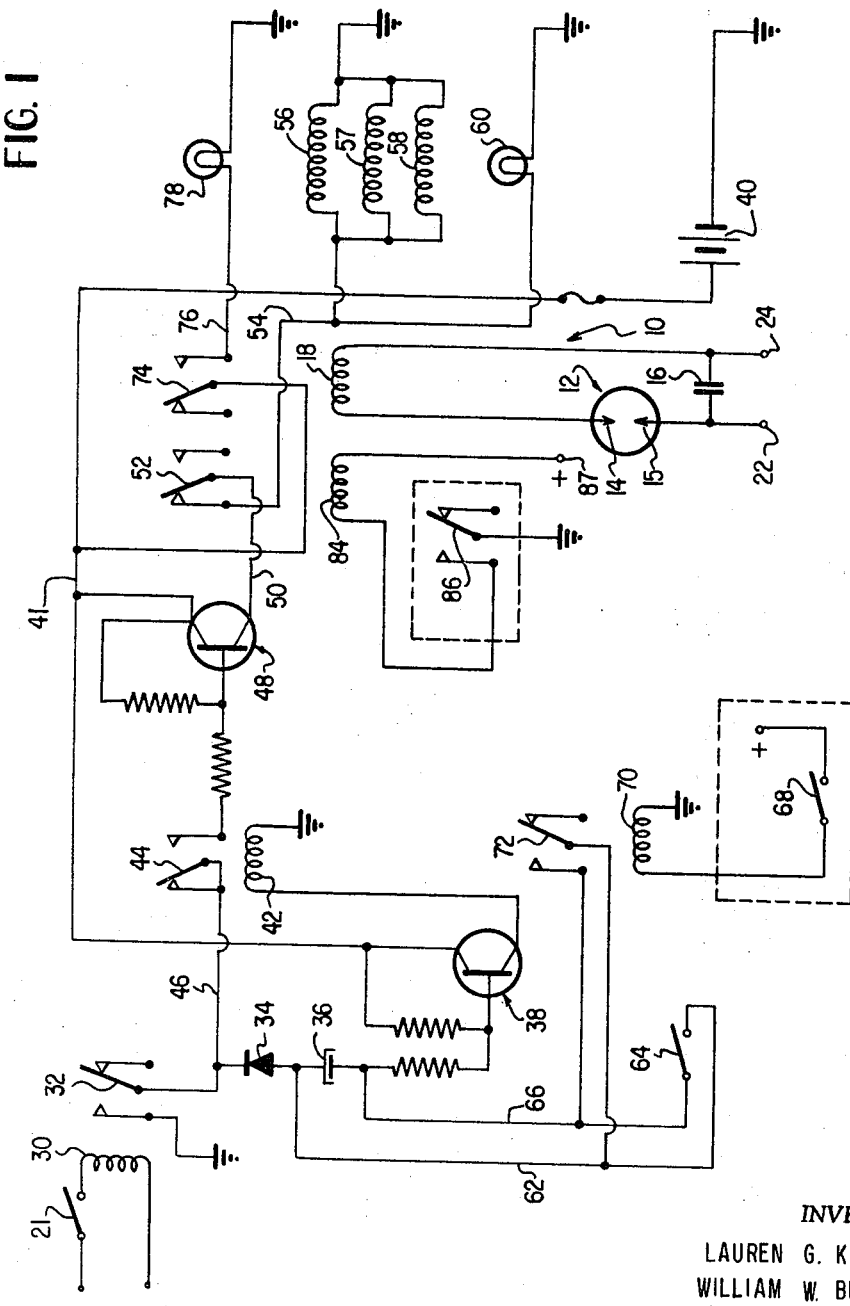
FIGURE 1 is a schematic diagram of the fill circuit including the flame detection circuit for the gas supply system of a seismic wave generator in accordance with our invention.

Referring more particularly to FIGURE 1, the flame detection circuit, which is generally designated by reference numeral 10, includes a control capacitor 16 and an ionization gap 12 formed by a pair of spark plugs 14, 15 which have their ground electrode removed. Control capacitor 16 has a predetermined voltage, e.g., about 1200 v., maintained thereon by a voltage supply and regulating circuit, generally designated by reference numeral 20 (see FIGURE 2), connected across the control capacitor 16 by lines 22 and 24. The control capacitor 16 functions to energize latching relay 18 thereby closing solenoid valves 174, 176 and 178 (see FIGURE 3) of the gas supply system of the exploder, as will be more fully described hereinbelow, when the ionization gap 12 is closed. When solenoid valves 174, 176 and 178 are open gas conduits 168, 170 and 172 (see FIGURE 3) fill the gas exploder, generally designated by reference numeral 150, for a fixed period of time determined by timer switch 21, thereby controlling the quantity of gas supplied to the exploder.

Referring again to FIGURE 1, timer switch 21 which has a fixed period of operation and is of conventional construction, energizes relay 30 to close switch 32 thereby energizing solenoid coils 56, 57 and 58 for valves 174, 176 and 178, respectively, in the following manner. Closure of switch 32 applies ground potential to the base of transistor 38 through diode 34 and capacitor 36 to switch transistor 38 from its non-conductive to its conductive state thereby completing the circuit through line 41 from voltage source 40 thereby energizing relay 42. Relay 42 actuates switch 44 to its closed position and ground potential is applied through line 46 and switch 32 to the base of transistor 48 driving transistor 48 to its conductive state and completing a circuit through lines 50 and 54 from voltage source 40 to the solenoid coils 56, 57 and 58. Switch 52, as shown in FIGURE 1, is normally closed to complete the circuit through line 50 to the solenoid valve coils 56, 57 and 58 so that the gas valves of the exploder gas supply system may normally be operated by the timer switch 31 to fill the exploder. A white light 60, which acts as a fill indicator, is also connected to line 54.

Once capacitor 36 has been charged, current cannot pass through line 34 to bias transistor 38 to its conductive state, thus preventing the accidental filling of the gas exploder a second time before the exploder has been fired. A blast switch 64 is connected across capacitor 36 by lines 62 and 66 for the purpose of discharging capacitor 36. Switch 64 can be a pressure actuated switch or any other conventional switch which will close upon the occurrrence of an explosion in exploder 150. A simple diaphragm switch responsive to movement of the exploder is quite suitable for this purpose. A manual switch 68, which energizes relay 70 to close switch 72 connected across lines 62 and 66, is provided to discharge the capacitor 36 if it proves desirable to fill the exploder a second time prior to an explosion, e.g., if the exploder has been allowed to stand for a long period of time after filling and the gas has leaked out.

Figure 2:
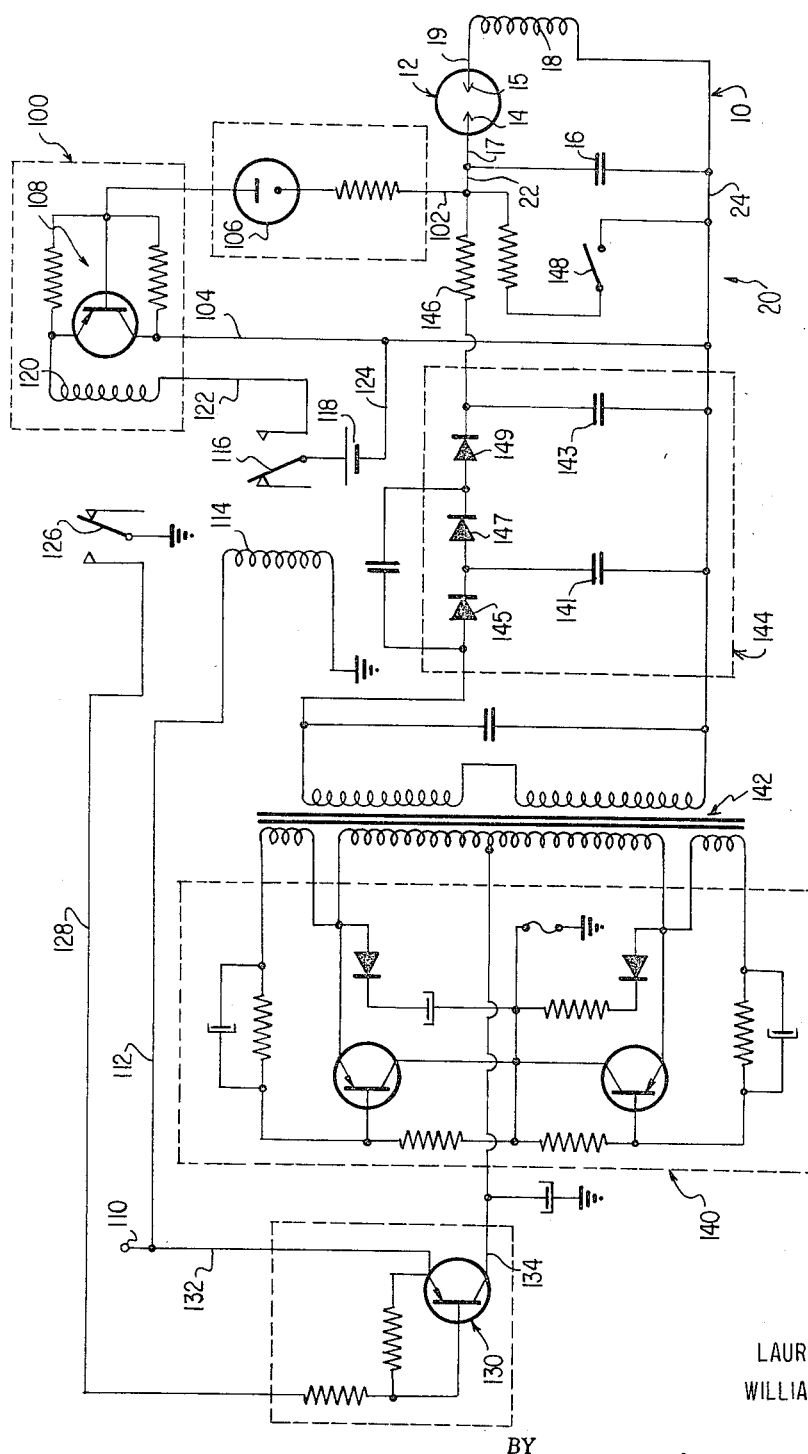
FIGURE 2 is a schematic diagram of the voltage supply and regulating circuit for the flame detection circuit in accordance with our invention.

Referring more particularly to FIGURE 2, control and supply circuit 20 consists primarily of power oscillator 140, rectification and filtering circuit 144 and voltage regulator 100. Voltage regulator 100 is designed not only to maintain a sufficient voltage, e.g., 1200 volts, on capacitor 16 to energize latching relay 18 when ionization gap 12 is conducting due to the presence of a flame, but also to prevent an overcharge on capacitor 16 which will result in ionization gap 12 conducting in the absence of a flame. Voltage regulator 100 is directly connected across capacitor 16 by lines 102 and 104, respectively. When the positive charge of capacitor 16, which is applied by line 102 to the cathode of voltage regulating tube 106, exceeds a predetermined voltage, slightly in excess of 1200 volts, regulating tube 106 will conduct thereby applying a positive pulse to the base of transistor 108 which will immediately become less conductive. The emitter and collector of transistor 108 are connected in series with coil 120, closed switch 116 and independent battery system 118. Switch 116 is maintained in its closed position by relay 114 which is directly connected to power supply 110 by conductor 112. When the positive pulse from regulating tube 106 switches transistor 108 to its non-conductive state, coil 120 becomes de-energized opening switch 126 to remove the ground bias from transistor 130, which, in turn, becomes non-conductive. When transistor 130 is non-conductive, voltage source 110 is removed from power oscillator 140 thereby preventing any further charging of capacitor 16 through rectifier circuit 144.

Under normal charging conditions tube 106 is non-conductive and relay 120 is energized, thereby closing switch 126 and applying ground potential to the base of transistor 130 by means of conductor 128. Since the base of transistor 130 is negative with respect to the emitter, transistor 130 conducts and voltage source 110 is applied to power oscillator 140 which will immediately begin to oscillate at a frequency determined by the physical characteristics of the circuit. Oscillator 140 is of conventional construction and, therefore, will not be discussed in detail. The voltage from oscillator 140 is stepped up by transformer 142 to a valve determined by the desired charge on capacitor 16. This voltage is then applied to rectification and filter stage 144 where the oscillating output of transformer 142 is half wave rectified by series connected diodes 145, 147 and 149 which are connected in series to protect them against the high voltage being rectified, each diode having a maximum of one-third of the output voltage of transformer 42 placed across it. The output voltage from rectifier and filter stage 144 charges capacitor 16 to its desired voltage through a current limiting resistor 146. Bleed switch 148 is placed across capacitor 16 so that the capacitor may be manually discharged when desired, i.e., during maintenances of the supply and control circuit 20.

FIGURE 3 illustrates the gas exploder, generally designated by reference numeral 150, of my co-pending application S.N. 314,230 referred to above and incorporated herewith by reference. The generator 150 is formed by a rigid top 151 which has a substantial mass applied thereon, and a rigid bottom (not shown) behind a retaining flange 152 which is placed upon the surface of the earth. Vertical extensible side walls connect the top 151 and bottom 152. Generator 150 may be transferred from one place of use to another by stub axles 153.

The gas charging and ignition system for generator 150 includes 4 up-standing conduits 161 connected at the upper ends through a header 162, a heavy metal block 164, conduit 165 and a mixing unit 166 to separate gas conduits 168, 170 and 172, having valves 174, 176, and 178 therein, respectively. Conduits 168, 170 and 172 are connected respectively to storage cylinders (not shown) containing a suitable fuel gas, such as methane, ethane, ethylene, propane, propylene, butane, etc.; a suitable oxidizing gas, such as oxygen; and an additional gas, such as a second fuel gas to provide mixed fuel gases if desired.

Each upstanding conduit 161 comprises a pipe 180 threadedly received at its lower end in an opening in the top 151 of generator 150, and threadedly received on the upper end of each conduit 161 is a 4-way fitting 182. Header 162 generally includes suitable nipples, elbows, T's, as well as pipes, to provide a U-shaped connection communicating the upper opening of each 4-way fitting 182 to the heavy metal block 164 and through the mixing unit 166 to conduits 168, 170 and 172.

Eight spark plugs 184 having the ground electrode removed are connected, two in each 4-way fitting 182, in the lateral openings of the fittings so that the insulated electrodes of each of the spark plugs 184 face each other in each fitting 182. The spark plugs 184 are electrically connected in series across a suitable electrical supply 186 which is capable of impressing a high voltage, e.g., on the order of 70,000 volts, across the serially connected spark plugs 184 at any desired time.

Referring more particularly to FIGURE 4, spark plugs 14 and 15 are arranged in the metal block 164 directly under the gas inlet conduit 165 from the gas mixing unit 166 in two lateral openings 163 so that their insulated electrodes 14' and 15', respectively, face each other but remain apart to form the ionization gap. Electrical leads 17 and 19 connect spark plugs 14 and 15 to the remainder of the flame detection circuit 10. Block 164 is of sufficient size to absorb the heat of the flames without damage which may occur when the gas enters during filling of the exploder.

In operation gas exploder 150 is located at a suitable location with bottom 152 resting on the ground at a spot clear of stones and other undesirable obstructions. Valves 174, 176 and 178 in conduits 168, 170 and 172, respectively, are then opened by energization of the solenoid coils 56, 57 and 58 through actuation of the timer switch 21 as described above, to admit fuel gas and oxygen to the exploder 150 until the pressure in the exploder 150 is about 2 p.s.i.g. It will be appreciated that a stoichiometric mixture of oxygen and fuel gas, or a slight excess of oxygen, is desired and that this can be achieved quite simply by introducing the gas such that the partial pressures are in the molar ratio of a stoichiometric mixture. Mixing unit 166 insures complete mixing of the gases before they are introduced into the chamber formed between the top 151 and bottom 152 of exploder 150.

If a flame is detected at any time during filling of the chamber in exploder 150, the flame detector of our invention operates to close valves 174, 176 and 178 and prevent passage of the gases through lines 168, 170 and 172 in the following manner. When a flame passes between the pair of spark plugs 14 and 15 forming the ionization gap 12, the gap between insulated electrodes 14' and 15' is ionized to a sufficient extent to complete the flame detector circuit 10 and allow capacitor 16 to energize latching relay 18. Energization of relay 18 closes switch 74 and opens switch 52 in the gas filling circuit. Opening of switch 52, which de-energizes the solenoid coils 56, 57 and 58, closes the solenoid valves 174, 176 and 178 controlled thereby and stops the supply of gas to the exploder. Closure of switch 74 completes a circuit in lines 76 to energize red light 78, which serves as a flame detector. In order to return the system to the conditions necessary for filling once it has been determined that it is permissible to again fill the exploder 150, it is necessary to energize reset relay 84 adjacent the latching relay 18 provides for closing switch 52 and opening switch 74. Reset relay 84 is controlled by a manually operated switch 86 which connects the relay across voltage source 87 as indicated. Reset relay 84 does not have sufficient strength to overcome the pull of latching relay 18 thus preventing accidental filling of exploder 150 during times of danger.

Once exploder 150 is filled with the explosive mixture, conduits 168, 172 and 174 are automatically closed since timer switch 21 energizes relay 30 only for a period of time sufficient to fill the exploder 150 with a combustile mixture of fuel gas and oxygen. Exploder 150 can be fired simply through igniting the gas mixture by energizing the electrical supply 186 at the desired time whereby a high potential is placed across the serial connection of the spark plugs 184. It is apparent that in the event of any fouling of spark plugs 184 at least two active gaps, e.g., from an insulated electrode to ground or another insulated electrode, are nevertheless provided such that the combustion of the mixture of gases within the exploder 150 is initiated, with a resultant explosion simultaneously occurring, with energization of spark plugs 184.

As the gases in generator 150 are exploded, after initiation of the seismic wave, the expansion of the gases quickly drives the weight of top 151 and its associated equipment upward relative to bottom 152. The vertical walls between the top 151 and bottom 152 allow limited vertical movement between associated parts; however, an exhaust and muffle arrangement generally designated by reference numeral 188 quickly releases the pressure in exploder 150 so that top 151 again collapses on bottom 152 within a fraction of a second.

It is claimed:

1. In a gas exploder-type seismic wave generator including means defining an explosion chamber, means for filling said chamber with an explosive gas mixture including at least one gas conduit, valve means adapted to open and close said conduit, and gas supply means, the improvement of an electrical flame detecting circuit for detecting the presence of a flame in said generator and means actuated by said flame detecting circuit for closing said valve means and thereby said conduit.

2. The device of claim 1 wherein said flame detecting circuit includes an ionization gap.

3. The device of claim 2 wherein said flame detecting circuit includes a control capacitor for supplying current to said ionization gap and further includes means for maintaining a predetermined voltage on said capacitor.

4. The device of claim 3 wherein said means for maintaining a predetermined voltage comprises a voltage supply and regulating circuit including a voltage source electrically connected in circuit with said capacitor, first means functioning as a switch in said circuit between said source and said capacitor, and second means for actuating said first means to close the circuit between said source and said capacitor when the voltage on said capacitor drops below a predetermined minimum and opens the circuit when said voltage exceeds a predetermined maximum.

5. The device of claim 4 wherein said second means includes an ionization-type tube.

6. The device of claim 2 wherein said ionization gap means consists of a pair of spark plugs each having only their insulated electrode, said insulated electrodes being spaced apart to define a gap therebetween.

7. In a gas exploder-type seismic wave generator including a rigid top and a rigid mass interconnected by vertically extensible sidewalls and defining an explosion chamber, means for filling said chamber with an explosive gas mixture including at least one gas conduit, automatically operated valve means in said conduit adapted to open and close said conduit, gas supply means for normally biasing said valve means to open said conduit, means for detecting the presence of a flame in said generator comprising a flame detecting circuit including an ionization gap means adapted to complete said detecting circuit upon the presence of a flame and means actuated by said detecting circuit for disconnecting said gas supply means to close said valve means and thereby close said conduit.

8. The device of claim 7 wherein said valve means is a solenoid valve, and said gas supply means includes an electrical circuit for operating said valve.

9. The device of claim 8 wherein the gas supply circuit includes means for preventing filling of said chamber a second time prior to firing of the explosive gas mixture comprising a capacitor in said gas supply circuit and including means for automatically discharging said capacitor upon firing of said explosive gas mixture.

10. The device of claim 9 wherein said means for disconnecting the gas supply means comprises switch means in said gas supply means, and said flame detecting circuit includes a latching relay for opening said switch means.

11. The device of claim 10 further including a reset circuit for said switch means having a reset relay for closing said switch means.

12. The device of claim 8 wherein said flame detecting circuit includes a control capacitor for supplying current to said ionization gap means and further including means for maintaining a predetermined voltage on said capacitor comprising a voltage supply and regulating circuit including a voltage source electrically connected in circuit with said capacitor, first means functioning as a switch in said last-mentioned circuit between said source and said capacitor, and second means for actuating said first means to close the circuit between said source and said capacitor when the voltage on said capacitor drops below a predetermined minimum and opens said last-mentioned circuit when said voltage exceeds a predetermined maximum.

13. The device of claim 12 wherein said gas supply circuit includes means for preventing filling of said chamber a second time prior to firing of the explosive gas mixture comprising a capacitor in said gas supply circuit and including means for automatically discharging said capacitor in said gas supply circuit upon firing of said explosive gas mixture.

References Cited

UNITED STATES PATENTS

| | | | |
|---|---|---|---|
| 2,332,380 | 10/1943 | Hess | 137—457 X |
| 2,343,001 | 2/1944 | Cohen | 328—6 |
| 2,385,976 | 10/1945 | Evans et al. | 328—6 X |
| 2,994,397 | 8/1961 | Huckabay | 181—.5 |

BENJAMIN A. BORCHELT, *Primary Examiner.*
G. H. GLANZMAN, *Assistant Examiner.*